United States Patent
Prikkel, III (10) Patent No.: US 9,016,705 B2
(45) Date of Patent: Apr. 28, 2015

(54) LEAF SPRING AND MOUNT

(71) Applicant: John Prikkel, III, Dayton, OH (US)

(72) Inventor: John Prikkel, III, Dayton, OH (US)

(*) Notice: Subject to any disclaimer, the term of this patent is extended or adjusted under 35 U.S.C. 154(b) by 0 days.

(21) Appl. No.: 14/207,975

(22) Filed: Mar. 13, 2014

(65) Prior Publication Data

US 2014/0265207 A1 Sep. 18, 2014

Related U.S. Application Data

(60) Provisional application No. 61/787,454, filed on Mar. 15, 2013.

(51) Int. Cl.
| | | |
|---|---|---|
| B60G 11/04 | (2006.01) | |
| F16F 1/18 | (2006.01) | |
| B60G 11/10 | (2006.01) | |

(52) U.S. Cl.
CPC ............... *F16F 1/185* (2013.01); *B60G 11/10* (2013.01); *B60G 2202/11* (2013.01); *B60G 2204/4306* (2013.01)

(58) Field of Classification Search
USPC .................. 280/124.111, 124.153, 124.163, 280/124.17, 124.174, 124.175
See application file for complete search history.

(56) References Cited

U.S. PATENT DOCUMENTS

| | | | |
|---|---|---|---|
| 4,637,595 A | | 1/1987 | Mishima et al. |
| 4,895,350 A | | 1/1990 | Schoof et al. |
| 5,921,570 A | * | 7/1999 | Lie .......................... 280/124.175 |
| 7,850,195 B2 | | 12/2010 | Simard et al. |
| 8,136,825 B2 | * | 3/2012 | Luna ....................... 280/124.175 |
| 8,827,289 B2 | * | 9/2014 | Dilworth et al. ........ 280/124.111 |
| 2001/0052685 A1 | * | 12/2001 | Svartz et al. ............ 280/124.116 |
| 2006/0103103 A1 | * | 5/2006 | Land et al. .............. 280/124.163 |
| 2009/0256328 A1 | * | 10/2009 | Dudding et al. ........ 280/124.175 |
| 2012/0153593 A1 | * | 6/2012 | Fruhmann et al. ...... 280/124.175 |
| 2012/0153594 A1 | * | 6/2012 | Heimann et al. ........ 280/124.175 |
| 2014/0035248 A1 | * | 2/2014 | Dilworth et al. ........ 280/124.106 |

OTHER PUBLICATIONS

Wikipedia, "Leaf Spring", http://en.wikipedia.org/wiki/Leaf_spring, downloaded Mar. 5, 2014.
Davidson, Michael; Invitation to Pay Additional Fees for PCT Application No. PCT/US2014/055580, date of mailing Jan. 7, 2015; European Patent Office; Rijswijk, Netherlands.

* cited by examiner

*Primary Examiner* — Toan To
(74) *Attorney, Agent, or Firm* — Thomas E. Lees, LLC (57) ABSTRACT

An axel mount for a leaf spring comprises a housing, an aperture, a support, and a mechanical stop. The support runs lengthwise on a shelf of the housing and has a length generally equal to a length of the housing. The mechanical stop is coupled to the support and reduces an amount of vertical deflection allowed to an associated leaf spring. Further, a windup preventer may be coupled to the support that prevents the leaf spring from entering a windup mode.

20 Claims, 6 Drawing Sheets

LEAF SPRING AND MOUNT

CROSS REFERENCE TO RELATED APPLICATIONS

This application claims the benefit of U.S. Provisional Patent Application Ser. No. 61/787,454, filed Mar. 15, 2013, entitled LEAF SPRING AND MOUNT, the disclosure of which is hereby incorporated by reference.

BACKGROUND

Various aspects of the present disclosure relate generally to leaf springs and mounts for leaf springs and specifically to prevention of failure in leaf springs.

A leaf spring is a suspension device used in heavy commercial vehicles such as vans, trucks, and rail cars. To provide suspension, the leaf spring spreads a load widely over the vehicle's frame. In contrast, a coil spring transfers the load to a single point on the frame. The leaf spring is basically a slightly arced band that bends (e.g., straightens out) to provide a cushioning effect.

The leaf spring attaches to the vehicle in at least three places: each end of the leaf spring attaches to the frame via "eyes." Further, a middle portion of the leaf spring attaches to an axel of the vehicle via U-bolts. Thus, when the vehicle hits a bump or brakes hard, the upward momentum is suppressed over the range of the frame between the ends of the leaf spring, and the driver experiences a smoother ride.

BRIEF SUMMARY

According to various aspects of the present disclosure, an axel mount for a leaf spring comprises a housing, an aperture, a support, and a mechanical stop. The support runs lengthwise on a shelf of the housing and has a length generally equal to a length of the housing. The mechanical stop is coupled to the support and reduces an amount of vertical deflection allowed in an associated leaf spring.

According to further aspects of the present disclosure, an axel mount for a leaf spring comprises a housing, an aperture, a support, and a windup preventer. The support runs lengthwise on a shelf of the housing and creates an inactive zone at least as long as the approximate length of the support. The windup preventer coupled to the support and prevents a portion of the leaf spring from buckling.

According to still further aspects of the present disclosure, a leaf spring comprises a middle portion and a front portion. The middle portion includes a first thickness. The front portion includes a bulge and an end, which has a second thickness that is less than the first thickness, and the thickness of the front portion gradually reduces from the first thickness to the second thickness along the length of the front portion. Further, the width of the bulge of the front portion gradually flares out along the length of the front portion to the end of the front portion.

According to still further aspects of the present disclosure, a suspension system comprises an axel mount described above, the leaf spring described above, or both.

DETAILED DESCRIPTION

According to various aspects of the present disclosure, a suspension system is disclosed. The system includes a leaf spring and an axel mount that mounts the leaf spring to an axel of a vehicle. Thus, when the vehicle hits a bump or brakes hard, the suspension system suppresses the shock from the bump or hard braking. The axel mount includes several embodiments including a mechanical stop, a windup preventer, or both. The leaf spring includes a bulge from at least one side of the leaf spring.

Figure 1:
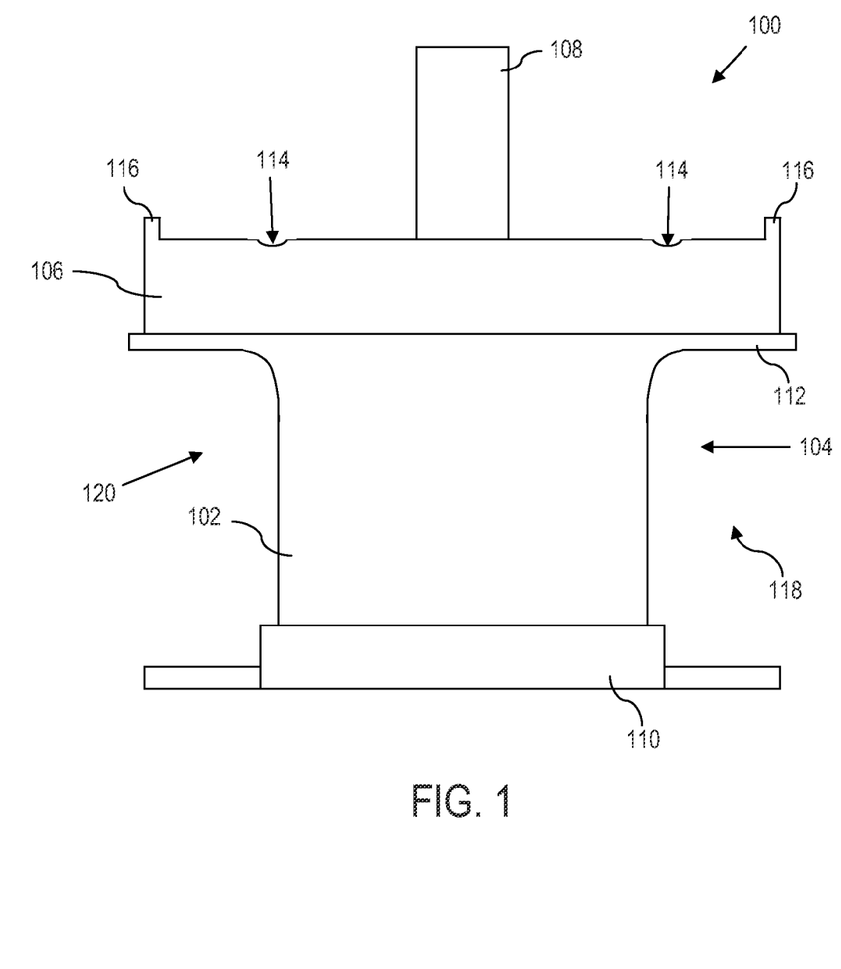
FIG. 1 is a side view of an axel mount with a mechanical stop, according to various aspects of the present disclosure.
Figure 2:
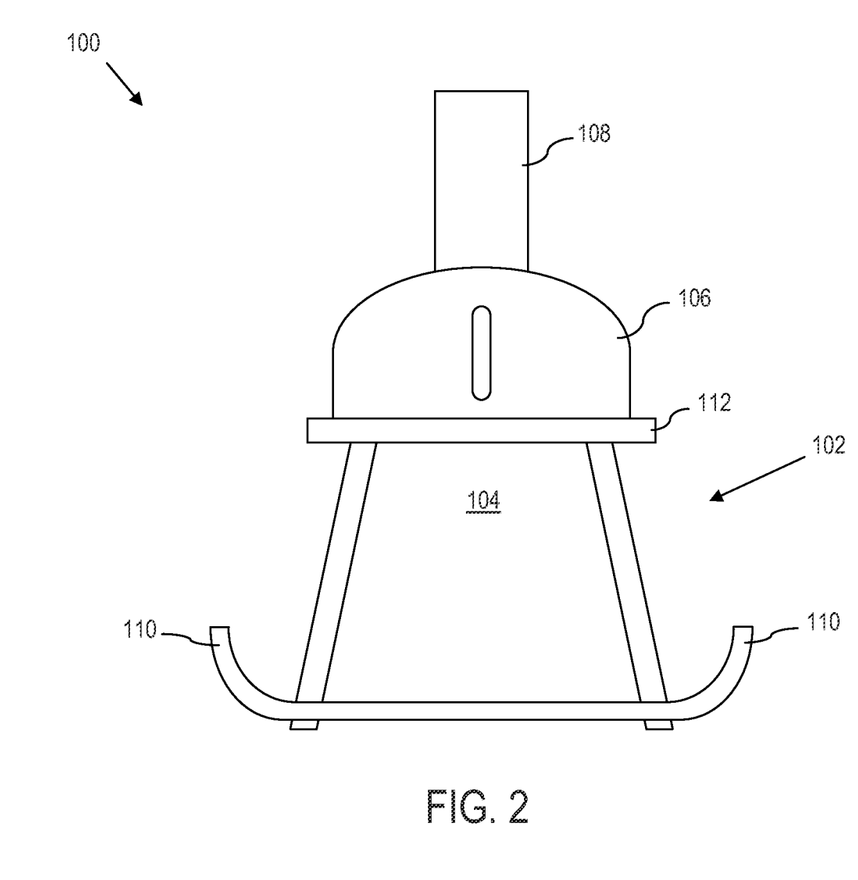
FIG. 2 is a side view of the axel mount with the mechanical stop of FIG. 1, according to various aspects of the present disclosure.

Turning to the figures, and in particular to FIGS. 1-2, an axel mount 100 includes a housing 102, an aperture 104 running lengthwise through the housing 102, a support 106, and a mechanical stop 108. The housing 102 may be a metal structure with four walled sides and can be any desired thickness. For example, the housing 102 may be a light-duty housing, a heavier-duty housing, or an extra-duty housing. As shown, the housing is the extra-duty housing as indicated by the curved portions 110 on the bottom wall. Further, the housing 102 need not be on integral piece. For example, a U-shaped overclamp (forming three walls) may be clamped onto a plate (forming one wall) to create the housing. Moreover, the walls do not need to be separated by angular corners; instead, they may be separated by curves, or combinations of corners and curves. Also, the walls do not need to be flat but may be curved (or combinations of curves and flat walls).

The aperture 104 runs lengthwise through the housing to allow a place for a leaf spring (not shown) to couple to the housing 102. The length of the leaf spring enclosed by the housing 102 is called an inactive length of the leaf spring.

Further, the housing includes a shelf 112 on the top wall. In some embodiments, the top wall of the housing 102 is the shelf 112 itself. Upon the shelf 112 rests the support 108, which in the example axel mount 100 is a half cylinder running lengthwise along the shelf 112. This support 106 can be coupled directly to the shelf 112 through any appropriate means (e.g., welding, integrally formed with the housing 102, etc.) and provides strength to the housing 102. In some cases, an insert (e.g., elastomeric, plastic, etc.) resides between the housing 102 and the spring leaf.

Moreover, the axel mount 100 is coupled to an axel using U-bolts, and the shape of the turning portion of the U-bolts should complement the shape of the support 106. For example, if the support 106 is generally a half cylinder, then the U-bolts should have a generally semi-circular turning portion. As another example, if the support 106 has a flat shape, then the U-bolts should have a squared turning portion. As shown, the support 106 includes two channels 114 and two ridges 116. The channels 114 provide a place for the U-bolts to rest without moving, and the ridges 116 ensure that the axel mount 100 does not slip out of the U-bolts and come uncoupled from the axel.

The mechanical stop 108 couples to the support 106 in any appropriate way (e.g., welding, formed integrally with the support 106, etc.). When the leaf spring mounted to a vehicle's axel bends, the mechanical stop 108 hits a frame of the vehicle and prevents the leaf spring from fully straightening out. In other words, the mechanical stop 108 reduces an amount of vertical deflection allowed to the leaf spring. As such, the leaf spring has a much less chance of buckling, which may result in the leaf spring breaking.

Further, the mechanical stop 108 reduces the amount of deflection of the leaf spring based on the height of the mechanical stop 108. For example, if the height of the mechanical stop 108 is four inches, then the mechanical stop 108 reduces the vertical deflection of the leaf spring by about four inches. As such, the height of the mechanical stop 108 may extend above the support 106 at least two inches up to twelve inches or more (depending on the arc of the leaf spring and the distance between the axel and frame of the vehicle).

The mechanical stop 108 may reside anywhere along the length of the support 106. For example, the mechanical stop 108 may reside approximately halfway between two ends 118, 120 of the support 106. In another example, the mechanical stop may be closer one end 118 than the other end 120 of the support 106.

Figure 3:
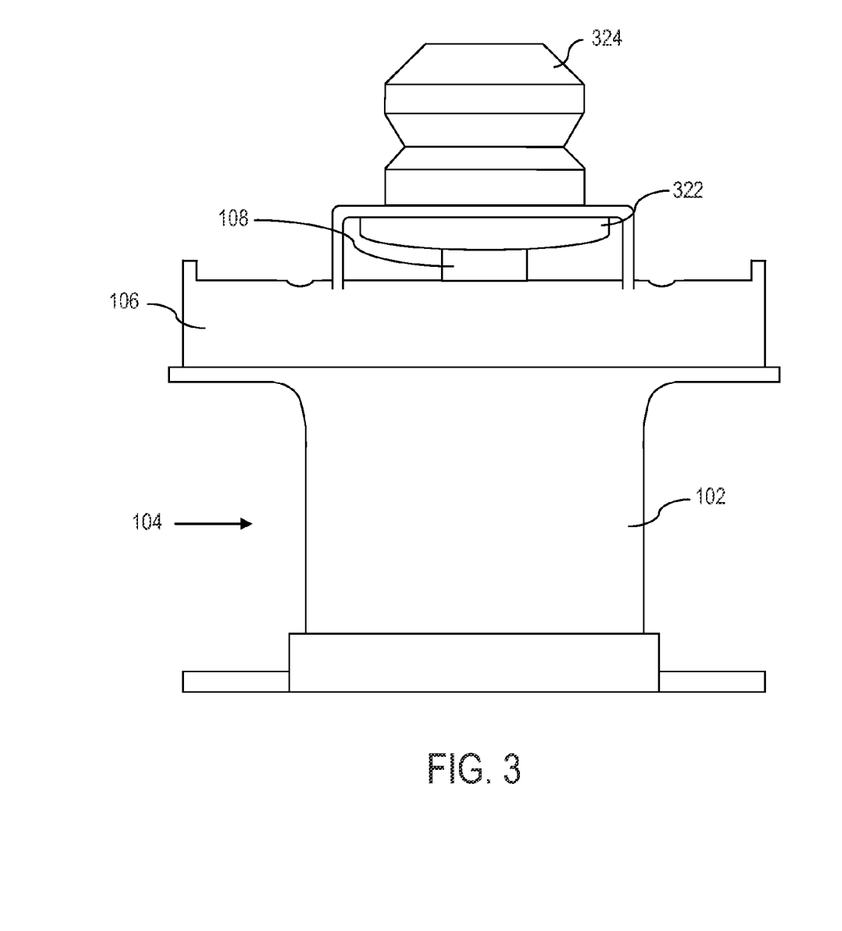
FIG. 3 is a side view of the axel mount with the mechanical stop of FIGS. 1-2 further including a spring socket and a rubber spring, according to various aspects of the present disclosure.

Referring now to FIG. 3, the axel mount 100 may include a socket 322 coupled to the support 106 such that the mechanical stop 108 extends through the socket 322, which holds a spring 324. The height of the spring 324 as the spring 324 rests in the socket 322 should be higher than the height of the portion of the mechanical stop 108 that is above the socket 324. Thus, the spring 324 surrounds the mechanical stop 108.

When the leaf spring bends, the spring 324 hits the vehicle frame before the mechanical stop 108 and will dampen the impact of the mechanical stop 108 against the frame. The spring 324 may be made of any suitable material (e.g., plastic, rubber, metal coil, combinations thereof, etc.). Further, the spring 324 may be coupled to the housing 102 without the use of a socket 322. For example, the spring 324 may rest on top of the housing 102. Moreover, the spring 324 is not required to be around the mechanical stop 108 and instead can be proximate to the mechanical stop 108.

The addition of the mechanical stop 108 to an axel mount 100 for a leaf spring reduces the vertical deflection allowed in the leaf spring, because the mechanical stop 108 hits the frame of the vehicle while the leaf spring still has flexibility to bend (e.g., straighten out). Thus, the entire leaf spring is less likely to buckle. Tests have shown that a combination of the mechanical stop 108 and the spring 324 provides a ride similar to an air suspension but requires none of the maintenance involved with the air suspension. Further, the axel mount 100 of FIGS. 1-3 allows a vehicle to carry more weight while not interfering with the steering or handling of the vehicle.

Figure 4:
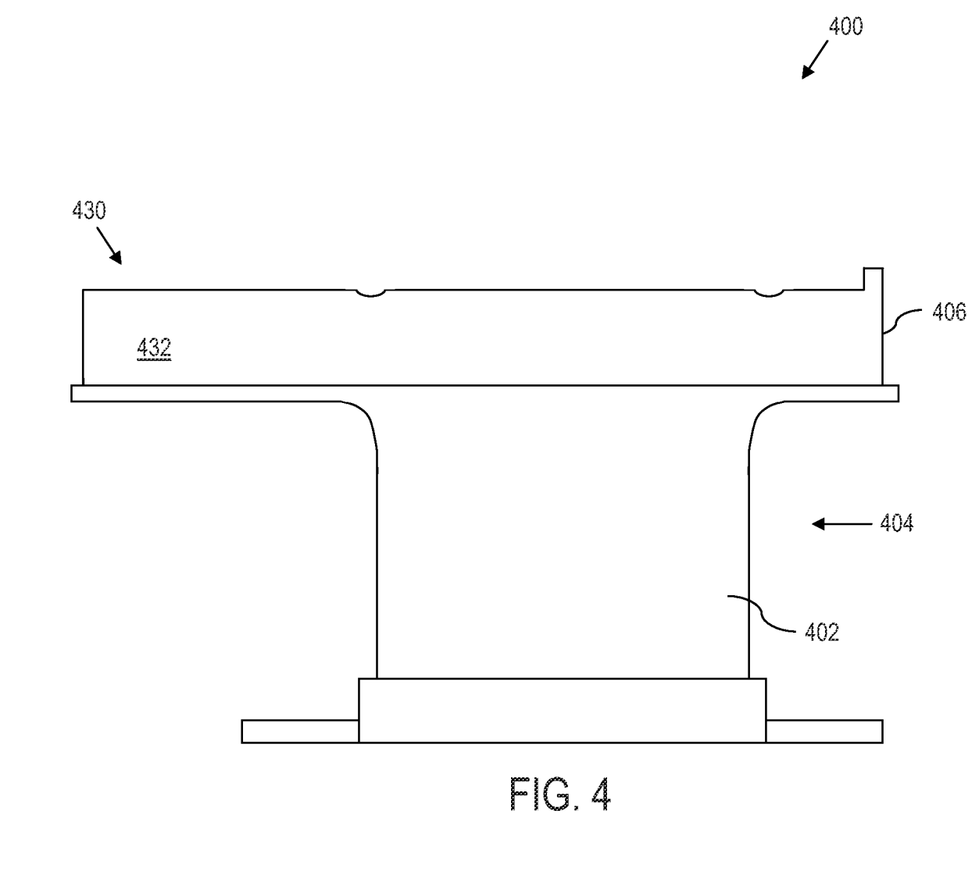
FIG. 4 is a side view of an axel mount with a windup preventer, according to various aspects of the present disclosure.

Turning now to FIG. 4, an axel mount 400 comprises a housing 402, aperture 404, and support 406, each similar to the housing 102, aperture 104, and support 106 of FIGS. 1-3. For a more detailed description of the housing 402, aperture 404, and support 406, refer to the similar components 102, 104, 106 in FIGS. 1-3 above. Further, the axel mount 400 includes a windup preventer 430 that is inside of the arc of a leaf spring when the leaf spring is coupled to the axel mount 400.

The windup preventer 430 is a device that prevents portions of the leaf spring from going into a windup event by limiting the flexibility of the leaf spring at certain points. In the embodiment of FIG. 4, the windup preventer 430 is an extension of the front 432 of the support 406, which increases the inactive length of the leaf spring on a front portion of the leaf spring. Thus, the windup preventer 430 effectively shortens the length of the front portion of the leaf spring. Because the front portion of the leaf spring is effectively shorter, the front portion requires more force to bend separately from the rest of the leaf spring.

Figure 5:
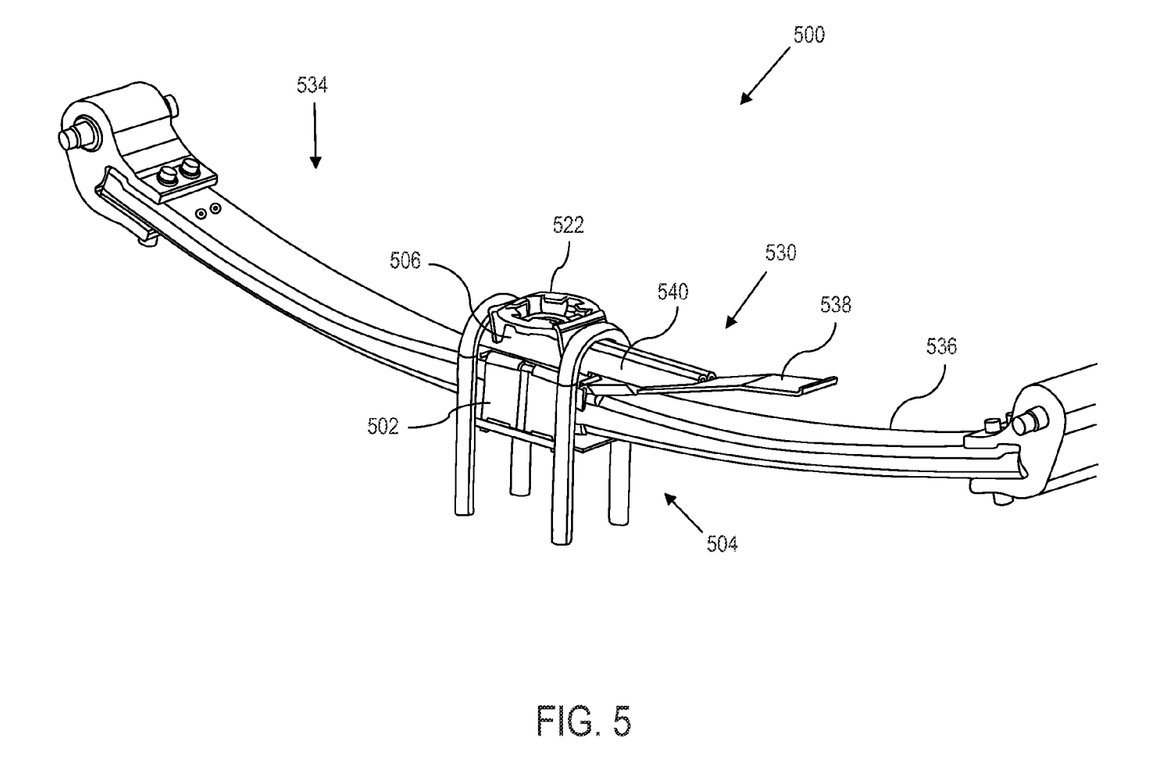
FIG. 5 is an isometric view of another embodiment of an axel mount with a windup preventer, according to various aspects of the present disclosure.

FIG. 5 illustrates another embodiment of an axel mount 500 with a windup preventer 530. As with the embodiments of FIGS. 1-4, the axel mount 500 includes a housing 502, aperture 504, and support 506. For a more detailed description of the housing 502, aperture 504, and support 506, refer to the similar components 102, 104, 106 in FIGS. 1-3 above. Further, FIG. 5 illustrates a leaf spring 534, which includes a front portion 536 and is inserted into the aperture 504 of the axel mount 500. Note that the windup preventer 530 is inside the arc of the leaf spring 534 when the leaf spring 534 is coupled to the axel mount 500. Further, the example axel mount 500 also includes a socket 522, but the socket 522 is not required (similar to the axel mount of FIG. 3).

The windup preventer 530 includes a tongue 538 extending at an upward angle from the housing 502. Further, the windup preventer 530 also includes a fulcrum 540 coupled to the housing 502 and applied to the tongue 538. When the front portion 536 of the leaf spring 534 starts to bend, the windup preventer 530 prevents the front portion 534 from buckling, thus preventing the leaf spring 534 from entering a windup event.

As mentioned above, the mechanical stop works on the entire length of the leaf spring; however, the windup preventer works only on one portion (e.g., the front portion) of the leaf spring. Further, an axel mount (e.g., 100, 400, 500, etc.) may have the mechanical stop 108, windup preventer 430, 530, or both.

Figure 6:
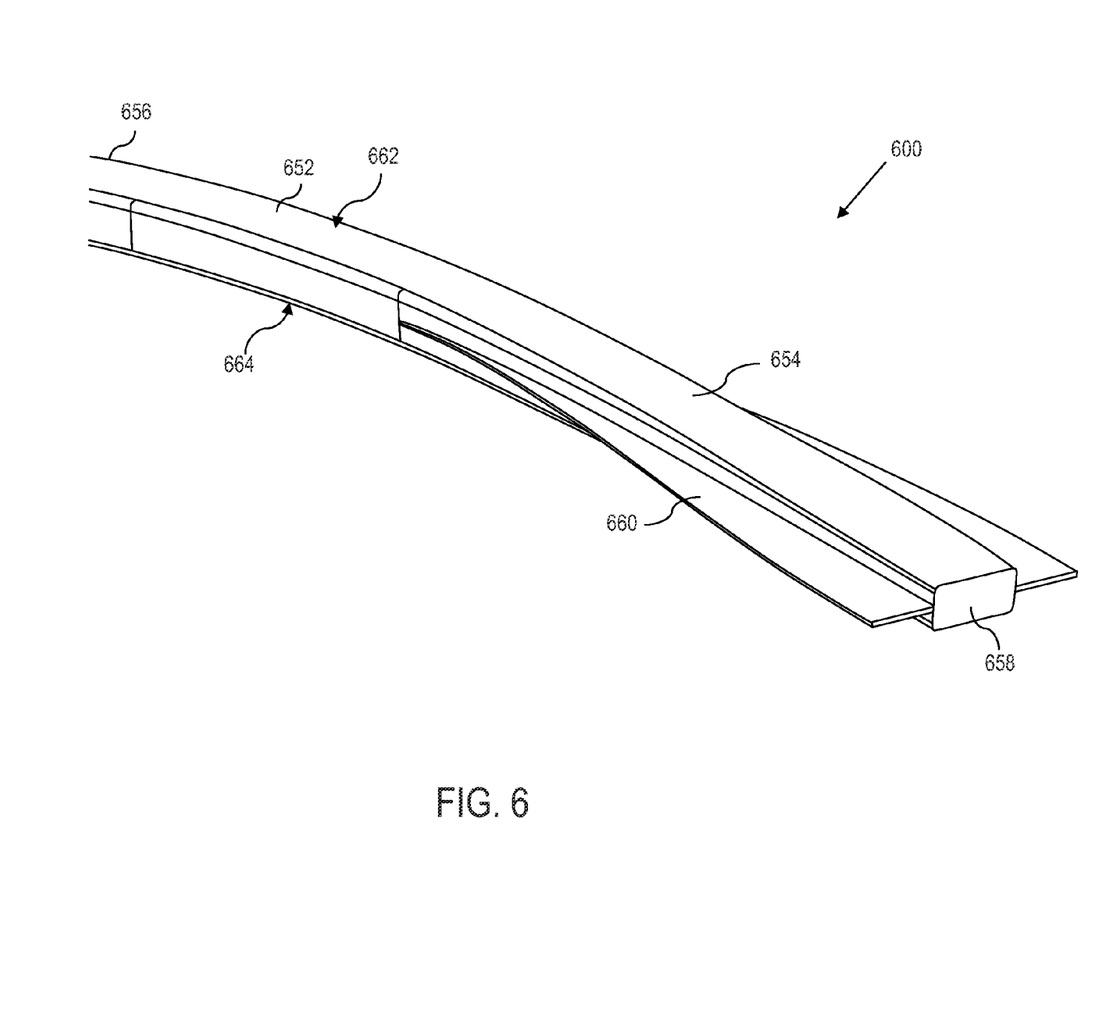
FIG. 6 is an isometric view of a leaf spring with a bulge, according to various aspects of the present disclosure.

In FIG. 6, a leaf spring 600 can be made of any suitable material (e.g., any suitable metal (e.g., steel), composite, or both) and comprises a middle portion 652 between a front portion 654 and a back portion 656. The thickness of the middle portion 652 is relatively constant. However, the thickness of the front portion 654 gradually decreases along the length of the front portion 654 from the middle portion 652 to an end 658 of the front portion 654. Further, the front portion 654 includes a bulge 660 running the length of the front portion 654, and the bulge 660 gradually increases in width (i.e., flares out along the length of the front portion to the end of the front portion). For example, the middle portion 652 may be 1.225 inches (approx. 3.1115 centimeters (cm)) thick. The thickness then gradually decreases along the front portion 654 until it reaches 1.042 inches (approx. 2.64668 cm) at the end 658 of the front portion 654.

The front portion 654 may be shorter than the back portion 656, but such a requirement is not necessary. Further, the bulge 660 may be present on one or both sides of the front portion 654. Moreover, a bulge may also be present on the back portion 656 if desired (on one side or both). Also, the width of bulge 660 of the front portion 654 may be inversely related to the thickness of the front portion 654 along the length of the front portion 654. For example, the bulge may be 0.125 inches (approx. 0.3175 cm) thick and flare out to be 1.739 inches (approx. 4.41706 cm) wide at the end.

When a leaf spring bends, the outer surfaces (i.e., top and bottom) of the leaf spring contract or expand; if one side expands, then the other side contracts. The leaf spring 600 of FIG. 6 reduces the separation between the top surface 662 and the bottom surface 664 (which is dependent on the thickness of the leaf spring). With that smaller separation, there is less stress placed on the surfaces 662, 664 when expanding and contracting. Thus, the leaf spring 600 withstands higher loads at stress compared to other leaf springs of the same thickness and does not splinter on the compression side (outside of the arc). Further, the leaf spring 600 results in a more uniform deflection, which prevents buckling and windup events.

The leaf spring 600 may be a stand-alone monolayer leaf spring, a portion of a multilayer leaf spring, a parabolic leaf spring, etc.

A suspension system comprises a leaf spring and an axel mount. As such, any of the axel mounts described herein may be used with traditional leaf springs, the innovative leaf springs as described above, or both (e.g., in a multilayer leaf spring). Moreover, the leaf springs described herein may be used with traditional axel mounts or the innovative axel mounts described herein.

The flowchart and block diagrams in the Figures illustrate the architecture, functionality, and operation of possible implementations of systems, methods and computer program products according to various embodiments of the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. An axel mount for a leaf spring, the axel mount comprising:
   a housing with a shelf;
   an aperture running lengthwise through the housing;
   a support running lengthwise on the shelf of the housing, wherein the support has a length generally equal to a length of the housing; and
   a mechanical stop coupled to the support, wherein the mechanical stop, reduces an amount of vertical deflection allowed in an associated leaf spring.

2. The axel mount of claim 1 further including a spring that surrounds the mechanical stop.

3. The axel mount of claim 1 further including:
   a socket coupled to the support such that the mechanical stop extends through the socket; and
   the spring couples to the socket and is a rubber spring.

4. The axel mount of claim 1, wherein the support is generally a half-cylinder.

5. The axel mount of claim 1, wherein the mechanical stop extends at least two inches above the support.

6. The axel mount of claim 1, wherein:
   the support has a first end and a second end, wherein the first end is opposite lengthwise from the second end; and
   the mechanical stop is approximately halfway between the ends of the support.

7. An axel mount for a leaf spring, the axel mount comprising:
   a housing with a shelf;
   an aperture running lengthwise through the housing;
   a support running lengthwise on the shelf of the housing, wherein the support creates an inactive zone at least as long as the approximate length of the support; and
   a windup preventer coupled to the support.

8. The axel mount of claim 7, wherein the windup preventer is an extension of the support.

9. The axel mount of claim 8, wherein the windup preventer further includes a tongue extending at an upward angle from the housing.

10. The axel mount of claim 7, wherein the windup preventer is a half cylinder and the support is a half cylinder.

11. The axel mount of claim 7 further including a mechanical stop coupled to the support, wherein the mechanical stop, reduces an amount of vertical deflection allowed to an associated leaf spring.

12. The axel mount of claim 11 further including a spring that surrounds the mechanical stop.

13. The axel mount of claim 12 further including:
   a socket coupled to the support such that the mechanical stop extends through the socket; and
   the spring couples to the socket and is a rubber spring.

14. A leaf spring comprising:
   a front portion including a bulge and an end; and
   a middle portion coupled to the front end;
   wherein:
      the thickness of the middle section is a first thickness;
      the thickness of the end of the front portion is a second thickness, which is less than the first thickness, and the thickness of the front portion gradually reduces from the first thickness to the second thickness along the length of the front portion;
      the width of the bulge of the front portion gradually flares out along the length of the front portion to the end of the front portion.

15. The leaf spring of claim 14,
   a back portion coupled to the middle portion, the back portion including a bulge and an end;
   wherein:
      the thickness of the end of the back portion is a third thickness, which is less than the first thickness, and the thickness of the back portion gradually reduces from the first thickness to the third thickness along the length of the back portion; and
      the width of the bulge of the back portion gradually flares out along the length of the back portion to the end of the back portion.

16. The leaf spring of claim 14, wherein the length of the front portion is shorter than the length of the back portion.

17. The leaf spring of claim 14, wherein the bulge is present along both sides of the length of the front portion.

18. The leaf spring of claim 14, wherein the width of bulge of the front portion is inversely related to the thickness of the front portion.

19. A suspension system comprising:
   an axel mount for a leaf spring, the axel mount comprising:
      a housing with a shelf;

an aperture running lengthwise through the housing;
a support running lengthwise on the shelf of the housing, wherein the support has a length generally equal to a length of the housing; and
a mechanical stop coupled to the support, wherein the mechanical stop, reduces an amount of vertical deflection allowed in an associated leaf spring; and a spring comprising:
a front portion including a bulge and an end; and
a middle portion coupled to the front end;

wherein:
the thickness of the middle section is a first thickness;
the thickness of the end of the front portion is a second thickness, which is less than the first thickness, and the thickness of the front portion gradually reduces from the first thickness to the second thickness along the length of the front portion;
the width of the bulge of the front portion gradually flares out along the length of the front portion to the end of the front portion; and
the axel mount couples to the middle portion of the leaf spring.

20. The suspension system of claim 19 further including a spring that surrounds the mechanical stop.

\* \* \* \* \*